United States Patent
Wimmer et al.

(10) Patent No.: US 8,077,201 B2
(45) Date of Patent: Dec. 13, 2011

(54) CAMERA SYSTEM FOR A MOTOR VEHICLE

(75) Inventors: Kilian Wimmer, Munich (DE); Guenter Bauer, Petershausen (DE); Thomas Mangold, Munich (DE); Axel Seinsche, Munich (DE); Alexander Augst, Munich (DE)

(73) Assignee: Bayerische Motoren Werker Aktiengesellschaft, Munich (DE)

( * ) Notice: Subject to any disclaimer, the term of this patent is extended or adjusted under 35 U.S.C. 154(b) by 1072 days.

(21) Appl. No.: 11/699,440

(22) Filed: Jan. 30, 2007

(65) Prior Publication Data

US 2007/0176083 A1  Aug. 2, 2007

(30) Foreign Application Priority Data

Jan. 31, 2006 (DE) .......................... 10 2006 004 260

(51) Int. Cl.
*H04N 7/18* (2006.01)
*H04N 5/33* (2006.01)
*H04N 5/225* (2006.01)

(52) U.S. Cl. ..... 348/146; 348/148; 348/168; 348/219.1; 348/344

(58) Field of Classification Search .................. 348/148, 348/149, 344, 146, 167, 168, 219.1
See application file for complete search history.

(56) References Cited

U.S. PATENT DOCUMENTS

| | | |
|---|---|---|
| 6,920,234 B1 | 7/2005 | Koenig et al. |
| 6,963,375 B1 * | 11/2005 | Lundberg ...................... 348/335 |
| 7,015,944 B2 | 3/2006 | Holz et al. |
| 7,358,498 B2 * | 4/2008 | Geng et al. .................... 250/347 |
| 2003/0193613 A1 | 10/2003 | Matko et al. |
| 2004/0155195 A1 | 8/2004 | Maurel |
| 2004/0179098 A1 * | 9/2004 | Haehn et al. .................. 348/148 |
| 2005/0179807 A1 | 8/2005 | Lin |

FOREIGN PATENT DOCUMENTS

| | | |
|---|---|---|
| DE | 199 21 488 A1 | 11/2000 |
| DE | 101 31 840 A1 | 1/2003 |
| DE | 102 55 194 A1 | 6/2004 |
| DE | 10 2004 026 993 A1 | 12/2005 |
| EP | 1 004 916 A1 | 5/2000 |
| JP | 05238310 * | 9/1993 |
| JP | 2004-082778 * | 3/2004 |
| JP | 2004-82778 A | 3/2004 |

OTHER PUBLICATIONS

European Search Report dated Jul. 15, 2008 with English translation of relevant portions (Five (5) pages).

* cited by examiner

*Primary Examiner* — Nhan T Tran
(74) *Attorney, Agent, or Firm* — Crowell & Moring LLP

(57) ABSTRACT

A camera system for a motor vehicle is described. Incident radiation is guided to a radiation receiving unit by means of one or more deflecting mirrors, where at least one deflecting mirror is configured to swivel. The swivelable deflecting mirror has a first mirror side, which is suitable for deflecting incident radiation, and a second mirror side, which is also suitable for deflecting incident radiation. The second mirror side exhibits a curvature shape that is different from that of the first mirror side. The swivelable deflecting mirror can be oriented in such a manner that incident radiation can be guided to the receiving unit by selecting one of the first or the second mirror side as an effective mirror surface.

23 Claims, 1 Drawing Sheet

CAMERA SYSTEM FOR A MOTOR VEHICLE

CROSS REFERENCE TO RELATED APPLICATIONS

This application claims priority under 35 U.S.C. §119 to German Patent Application No. 10 2006 004260.3 filed Jan. 31, 2006, the entire disclosure of which is herein expressly incorporated by reference.

BACKGROUND AND SUMMARY OF THE INVENTION

The invention relates to a camera system for a motor vehicle, in which incident radiation is guided to a radiation receiving unit by means of one or more deflecting mirrors, where at least one deflecting mirror is configured so as to swivel.

Modern motor vehicles employ increasingly more camera-based functions. One consideration with respect to such cameras that are used for said functions is to mount the cameras in the motor vehicle in such a manner that they are protected and require little space.

For applications in which the radiation, for example visible light or infrared radiation, is to be received from the direction of travel of the motor vehicle, conventional systems include cameras having a lens which is also oriented directly in the direction of travel. Therefore, the camera is exposed to the risk of stone impact, moisture and other environmental influences. In addition, the camera occupies a relatively large area at the front of the vehicle, a feature that may have a negative effect on the air cooling of the components of the vehicle. When it is necessary that the radiation be received from different directions, the entire camera package in such devices is designed so that it can move. In such devices an optical zoom is possible only with an optical system that is installed in the respective camera.

To increase the freedom to choose an installation site for a camera, camera systems can be used in which a single deflecting mirror or a plurality of deflecting mirrors guide the light. These mirrors serve to guide the incident radiation to the actual receiving unit of the camera system. The receiving unit can thus be shifted from the desired receiving site, where the incident radiation is to be received. The incident radiation at the receiving site is guided to the receiving unit by means of the mirror optics. The use of such a mirror optical system is appropriate especially for camera systems in which there is only limited space at the receiving site for mounting the camera system, for example in the outside mirror of a motor vehicle.

The use of an optical system with mirrors can also guarantee enhanced protection for the receiving unit of a camera system against environmental influences. Since only a deflecting mirror, and not the receiving unit itself, has to be oriented in the direction of travel, the receiving unit can be disposed in such a manner that it is protected against direct stone impact and other environmental influences. Using such a system it is also possible to produce a device having a very small frontal area, for example only causing an obstruction the size of the deflecting mirror at the front of the vehicle. Such a feature yields a number of advantages for the air cooling of the vehicle components.

It is known, for example from the DE 10255194 A1, to use swivelable deflecting mirrors for camera systems in motor vehicles, in order to cover different receiving areas. Thus, a single camera can be used for receiving radiation from different directions. Only the deflecting mirror has to be swiveled, a feature that is usually realized with less technical complexity than the swiveling of a complete camera package.

Conventional camera systems that use deflecting mirrors exhibit several drawbacks. For example, the use of rigid deflecting mirrors offers only very few options for adjusting the optical parameters of the system, such as the aperture angle for receiving the radiation. To eliminate this drawback, there exist, for example, deflecting mirrors with variable curvature and/or micro-mirror arrays. However, owing to the high cost of materials and production as well as excessive technical complexity, the practical use of such systems in automobiles has been limited.

The Exemplary embodiments of the invention provide a simple camera system for a motor vehicle, which can be mounted in such a manner that it occupies little space and is protected from the environment, and which also has a variable aperture angle.

According to the invention, a camera system for a motor vehicle is provided, in which incident radiation is guided to a radiation receiving unit by means of an optical system with one or more deflecting mirrors. At least one deflecting mirror is configured so as to swivel; and the at least one swivelable deflecting mirror exhibits a first mirror side which is suitable for deflecting incident radiation, and a second mirror side, which is also suitable for deflecting incident radiation. The second mirror side exhibits a curvature shape that is different from that of the first mirror side. The at least one swivelable deflecting mirror is swivelable in such a manner that incident radiation can selectively be guided to the receiving unit by either the first or by the second mirror side.

Other advantageous embodiments and further developments of the invention are disclosed in the following.

According to the embodiments of the invention, it is always only either the first or the second mirror side that can be selected to effectively act as the deflecting mirror. No expensive mechanism to adapt the shape of the curvature of a deflecting mirror is necessary. Instead, the mirror side acting as the effective deflecting mirror, is simply alternated between the two sides of the mirror. For example, the deflecting mirror may be rotated about 180 degrees to switch between the two reflective sides thereof.

The invention achieves with very little technical complexity the feature that the aperture angle of the camera system can be varied, at least between any two sets of characteristics. In addition to a variation of the aperture angle, any variation in the optical characteristics that can be produced by different shapes of the curvature of the two mirror sides can be achieved by switching between the two mirror sides. For example, the first mirror side may exhibit a symmetrical distortion characteristic, while the second mirror side may have an asymmetrical distortion characteristic.

Additional embodiments of the invention can also include deflecting mirrors with more than two mirror sides and correspondingly more than two different shapes of curvature. However, a swivelable deflecting mirror with two mirror sides disposed back to back, which are offset from each other by approximately 180 degrees, can be produced in a very simple way with little material. The exemplary deflecting mirror can be constructed substantially flat and with very little weight. In different embodiments, the assembly may have a configuration with six mirror sides, for example disposed in the shape of dice.

In one embodiment, the camera system includes a drive mechanism for swiveling at least one swivelable deflecting mirror and a related drive control. The low weight of the deflecting mirror is especially advantageous for dimensioning such a drive.

For example, the at least one swivelable deflecting mirror can be swiveled in such a manner that with a single mirror side radiation from different directions can be guided to the radiation receiving unit. Therefore a swivel function, to orient the effective deflecting mirror towards multiple sources of radiation, can also be used in connection with the invention. According to an especially preferred embodiment of the invention, the at least one swivelable deflecting mirror can be rotated about at least two rotational axes, in order to guide the radiation from different directions to the radiation receiving unit with a single mirror side. Thus, for example, the effective deflecting mirror can swing along both a horizontal and a vertical translation path.

The exemplary swivelable deflecting mirror can be swiveled about a rotational axis in such a manner that the source direction of the radiation, which is guided to the radiation receiving unit by the single effective mirror side, can be varied as desired. In addition, the mirror side that is used as the effective mirror side can be alternated. In this way a single drive accomplishes both a swivel function for receiving the radiation from different directions and a switching function that changes the mirror side that acts as the effective reflective surface of the deflecting mirror. A drive control to achieve these two functions can be implemented correspondingly with a simple design.

The camera system according to the embodiments can be used for a variety of vehicle functions by using different mirror sides of the deflecting mirror. Similarly, the inventive camera system can be used for various modes of a vehicle function by using the different mirror sides of the deflecting mirror. For example, the first mirror side may be constructed in such a manner that it provides a large effective aperture angle for taking a picture with the camera system. This feature may be helpful, for example, in monitoring the near environment of the vehicle. The second mirror side may be constructed in such a manner that it provides a small effective aperture angle for taking a picture with the camera system, a feature that offers many advantages in monitoring the near field over a wide range.

In another embodiment of the invention, the radiation receiving unit may be suitable for receiving infrared radiation. Specifically, the radiation receiving unit can be suitable for receiving infrared radiation of the near and/or far infrared range. The above-described benefits with respect to protection against stone impact, moisture and other environmental influences apply especially to infrared cameras, which are often very expensive. Since infrared cameras are also often relatively bulky compared to other cameras, the invention provides the additional benefit of a small size, suited to the limited space at the desired location and promoting the unimpeded air cooling of the vehicle components by covering as little frontal area as possible at the front of the vehicle.

In embodiments where the receiving unit is suitable for receiving infrared radiation, the related mirror optical system is also suitable for guiding the infrared radiation to the receiving unit. Accordingly, the surface of the first mirror side of the deflecting mirror and the surface of the second mirror side of the deflecting mirror are preferably suited for reflecting infrared radiation. This requires special materials, such as, for example, high-grade steel and germanium. Consequently, at least the surfaces of the first and the second mirror side of the deflecting mirror used for infrared applications may be made preferably of fine-grade steel and/or germanium. To use the respective material economically, the mirror sides of the deflecting mirror may be only coated with the desired material.

In an exemplary camera system according to the invention, the swivelable deflecting mirror can be housed both outside the camera package, or may be housed jointly with the radiation receiving unit inside the camera package. In the latter case, owing to the housing of the camera package, the deflecting mirror as well as its mounting and its drive can receive greater protection against environmental influences.

Other objects, advantages developments and novel features of the present invention will become apparent from the following detailed description of the invention when considered in conjunction with the accompanying drawing.

DETAILED DESCRIPTION OF THE DRAWINGS

Figure 1:
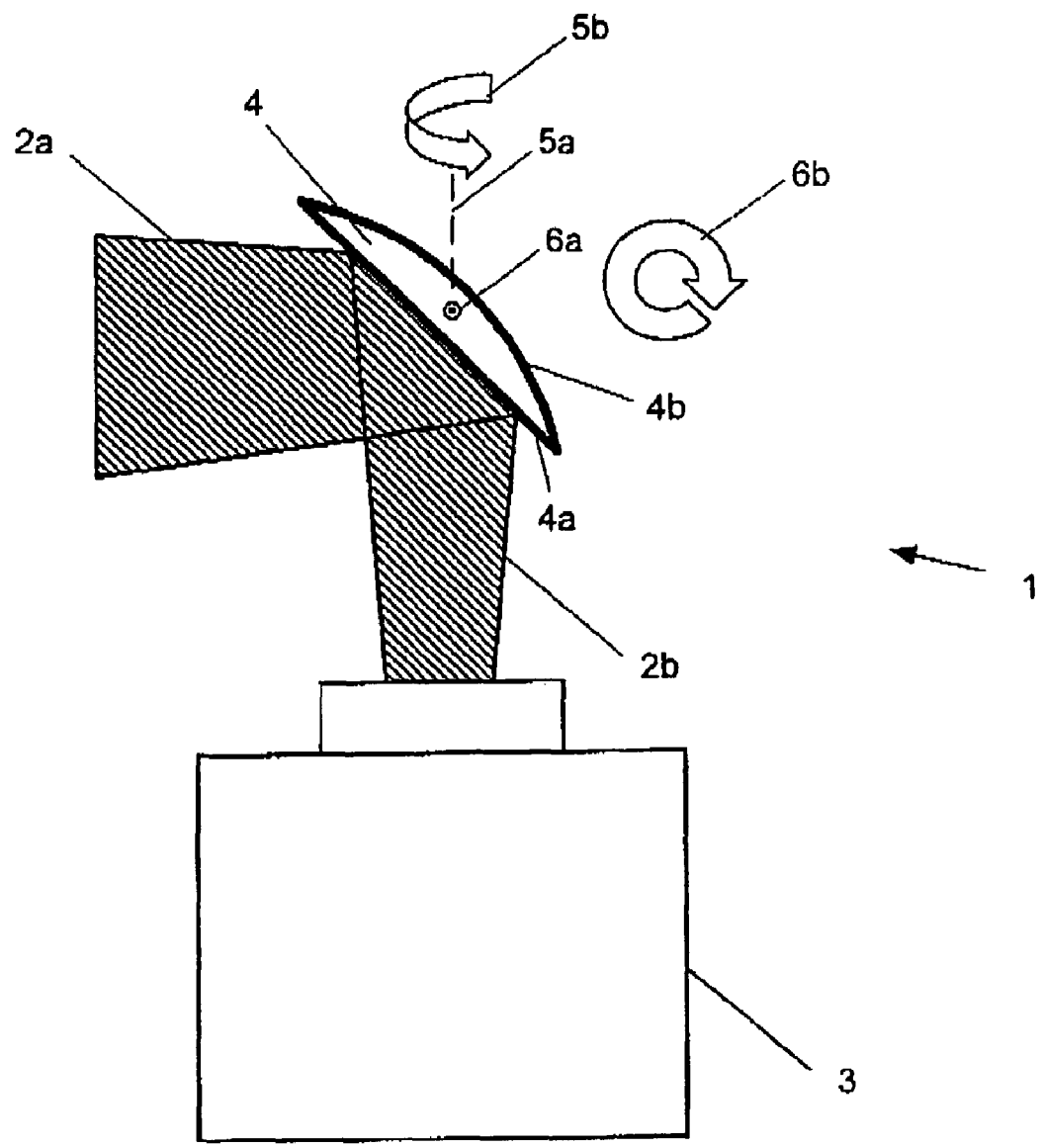
FIG. 1 depicts an exemplary embodiment of a camera system according to the invention.

FIG. 1 is a schematic drawing of a preferred embodiment of a camera system, according to the invention. The camera system 1 includes a receiving unit 3 and a deflecting mirror 4.

The receiving unit 3 is, for example, a remote infrared camera and is suitable for receiving remote infrared radiation. Said unit can be used in different modes in a night vision system for the purpose of providing assistance to the driver of a motor vehicle. The camera may be disposed transversely to the direction of travel in a motor vehicle (not illustrated in the drawing). The deflecting mirror 4 receives the infrared radiation 2a, which impinges on the deflecting mirror 4 along the direction of travel, and reflects it as the infrared radiation 2b, in the direction of the receiving unit 3 so that the receiving unit 3 may receive it.

As shown in the illustration of the top view of the camera system 1, the direction of travel is to the left. The mirror side 4a of the deflecting mirror 4 serves to reflect the incident infrared radiation 2a downward as the reflected radiation 2b, toward the receiving unit 3.

The deflecting mirror 4 can be swiveled about two axes 5a and 6a (projecting outside the drawing plane of FIG. 1). Two drive units (not illustrated in the drawing) and one drive controller operatively connected to the two drive units are used to swivel said deflecting mirror 4. The drive controller in turn is operatively connected to the night vision system for the purpose of assisting the driver. The infrared images taken with the receiving unit 3 may be sent to the night vision system for processing and display.

As shown, rotation about the axis 5a, which is illustrated by the rotating arrow 5b in FIG. 1, corresponds to a vertical swing of the deflecting mirror with respect to the motor vehicle. A vertical swing about the axis 5a can be executed in an exemplary angular range of about +/−15 degrees.

A rotation about the axis 6a, which is illustrated by the rotating arrow 6b in FIG. 1, corresponds to a horizontal swing of the deflecting mirror with respect to the motor vehicle. A horizontal swing about the axis 6a can be executed, for example, in an angular range between about −30 degrees and about +210 degrees. Owing to the large angular deflection range possible in the horizontal swing, the deflecting mirror 4 can be rotated by 180 degrees such that the incident infrared radiation 2a impinges on the mirror side 4b, not on the mirror side 4a. In this folded configuration, the mirror side 4b serves to reflect the incident infrared radiation 2a in the direction of the receiving unit.

In addition to switching the effectively used mirror side by rotating the mirror 4 over the range of 180 degrees, a more reduced angular rotation range of between about −30 degrees and about +30 degrees may be provided. This reduced rotation range may be used for the purpose of guiding incident radiation from various horizontal directions to the receiving unit 3 with a single effective mirror side of the deflecting mirror 4, without switching to the other mirror side.

According to the invention, the two mirror sides 4a and 4b exhibit different shapes of curvature. The result of these different shapes of curvature is that the effective optical aperture angle of the camera system 1 varies. By switching between the two mirror sides 4a and 4b, it is possible to realize a change-over between the two different aperture angles. The two adjustable and different aperture angles are used in two different modes of the aforementioned night vision system.

In the above described embodiment the two mirror sides are alternated, for example, in an advantageous manner by simply swiveling a single moveable component, i.e., the deflecting mirror 4. No dedicated drive element is required to switch between the mirror sides. The same drive element is used that is also used to guide the radiation from different horizontal directions to the receiving unit 3 by rotating a single mirror side of the deflecting mirror 4.

The night vision system according to the invention may utilizes control commands sent to the drive control unit both to switch between the two mirror sides as a function of the respective desired mode, and also within each of the two modes to provide horizontal adjustment in an angular range between about −30 degrees and about +30 degrees as well as a vertical fine adjustment in an angular range of about +/−15 degrees.

The mirror sides 4a and 4b of the exemplary deflecting mirror 4 may be coated with germanium. Therefore, incident infrared radiation is largely not absorbed, but rather reflected.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A camera system for a motor vehicle, comprising:
an optical system mounted to the motor vehicle in which incident radiation is guided to a radiation receiving unit, which is oriented facing a direction transversely related to a direction of travel of the motor vehicle, using at least one swivelable deflecting mirror mounted to a frontal area of the vehicle, the at least one swivelable deflecting mirror comprising a first mirror side suitable for deflecting incident radiation, and a second mirror side suitable for deflecting incident radiation, wherein the second mirror side exhibits a curvature shape that is different from a curvature shape of the first mirror side, and wherein the at least one swivelable deflecting mirror is swivelable in such a manner that incident radiation can be guided to the receiving unit by swiveling the deflecting mirror to selectively switch between the first and the second mirror sides, wherein the at least one swivelable deflecting mirror is configured to swivel about at least two planes of rotation, and wherein the axes for each of said planes of rotation pass through the swivelable deflecting mirror, and wherein further the at least one swivelable deflecting mirror swivels in one of the at least two planes of rotation across an angular range, limited to no more than about +/−15 degrees, in order to reflect radiation originating from different directions.

2. The camera system, as claimed in claim 1, wherein the at least one swivelable deflecting mirror comprises two mirror sides.

3. The camera system, as claimed in claim 1, wherein the at least one swivelable deflecting mirror is orientable such that a selected one of the first and second mirror sides reflects radiation from different directions towards the radiation receiving unit.

4. The camera system as claimed in claim 1, wherein the at least one swivelable deflecting mirror is swivelable such that the incident radiation originating from multiple directions is selectively reflected to the radiation receiving unit by an effective mirror surface, and such that the effective mirror surface is selectable by switching between the first and the second mirror sides.

5. The camera system, as claimed in claim 1, further comprising a drive of the camera system for swiveling the at least one swivelable deflecting mirror, and a related drive controller.

6. The camera system, as claimed in claim 1, wherein each of the first and second mirror sides of the swivelable deflecting mirror of the camera system corresponds to a different vehicle function.

7. The camera system, as claimed in claim 6, wherein the camera system is switchable between various vehicle functions by switching between the first and the second mirror sides of the swivelable deflecting mirror.

8. The camera system, as claimed in claim 1, wherein the radiation receiving unit is suitable for receiving infrared radiation.

9. The camera system, as claimed in claim 1, wherein a surface of the first mirror side of the deflecting mirror and a surface of the second mirror side of the deflecting mirror are suitable for reflecting infrared radiation.

10. The camera system of claim 1, wherein the axes of each of said planes of rotation intersect each other.

11. The camera system of according to claim 1, wherein the optical system produces an obstruction at the frontal area that is substantially the size of the swivelable deflecting mirror.

12. The camera system according to claim 1, wherein the swivelable deflecting mirror swivels in another of the at least two planes of rotation by no more than about +/−30 degrees in order to reflect radiation from different directions.

13. The camera system according to claim 1, wherein the at least one swivelable deflecting mirror swivels in the one of the at least two planes of rotation across the angular range of no more than about +/−15 degrees as a vertical fine adjustment.

14. An optical system for reflecting incident radiation, comprising:
a swivelable deflecting mirror, mounted to a frontal area of a motor vehicle, for reflecting the incident radiation towards a radiation receiving unit that is oriented facing a direction transversely related to a direction of travel of the motor vehicle;
a first mirror side of the swivelable deflecting mirror having first optical characteristics;
a second mirror side of the swivelable deflecting mirror having second optical characteristics; and
a drive mechanism for selecting an effective reflective surface of the swivelable deflecting mirror by switching between the mirror sides, wherein the at least one swivelable deflecting mirror is configured to swivel about at least two planes of rotation, and wherein the axes for each of said planes of rotation pass through the swivelable deflecting mirror, and wherein further the drive mechanism's swiveling of the swivelable deflecting mirror in one of the at least two planes of rotation occurs over an angular range, limited to no more than about +/−15 degrees, in order to reflect radiation originating from different directions.

15. The optical system according to claim 14, wherein the swivelable deflecting mirror swivels no more than about −30 degrees to about +30 degrees in another of the at least two planes of rotation to reflect the radiation originating from different directions.

16. The optical system according to claim 14, wherein the swivelable deflecting mirror swiveled by about 180 degrees in another of the at least two planes of rotation in order to switch the effective mirror surface between the first and the second mirror sides.

17. The optical system according to claim 14, further comprising additional mirror sides of the swivelable deflecting mirror selectable by the drive mechanism.

18. The optical system according to claim 14, wherein the swivelable deflecting mirror is optimized to reflect infrared radiation.

19. The optical system according to claim 14, wherein the first mirror side has a first curvature, and the second mirror side has a second curvature.

20. The optical system according to claim 14, further comprising a controller unit of the drive mechanism for commanding a swivel function of the swivelable deflecting mirror to reflect incident radiation from different directions, and a switching function to select an effective reflective surface of the swivelable deflecting mirror.

21. The optical system according to claim 14, wherein the axes of each of said planes of rotation intersect each other.

22. The optical system according to claim 14, wherein the optical system is configured to produce an obstruction at the frontal area that is substantially the size of the swivelable deflecting mirror.

23. The optical system according to claim 14, wherein the drive mechanism's swiveling of the swivelable deflecting mirror in the one of the at least two planes of rotation occurs over the angular range of no more than about +/−15 degrees as a vertical fine adjustment.

* * * * *